United States Patent [19]
Kato et al.

[11] 4,112,602
[45] Sep. 12, 1978

[54] APPARATUS FOR COLLECTING SHELLFISH AND THE LIKE

[76] Inventors: Hisao Kato, No. 37, 2-Chome, Showa-Machi, Nemuro City, Hokkaido; Yohei Sakamoto, No. 1, 1-Chome, Hon-Cho, Nemuro City, Hokkaido, both of Japan

[21] Appl. No.: 723,470

[22] Filed: Sep. 15, 1976

[51] Int. Cl.² .................. A01K 75/00; E07F 5/00
[52] U.S. Cl. .................................. 37/55; 37/119; 37/195; 172/738
[58] Field of Search ............ 37/55, 119, 195, 71; 299/8; 172/738

[56] References Cited

U.S. PATENT DOCUMENTS

| | | | |
|---|---|---|---|
| 27,213 | 2/1860 | Force | 37/119 |
| 120,463 | 10/1871 | Sink | 37/119 |
| 484,520 | 10/1892 | Koenig | 172/738 |
| 1,413,944 | 4/1922 | Sockwell | 37/119 |
| 2,648,918 | 8/1953 | Mazzella | 37/55 |
| 2,985,974 | 5/1961 | Worcester | 37/55 |
| 3,084,309 | 4/1963 | Wiegardt, Jr. | 37/55 X |
| 3,113,389 | 12/1963 | Vuskovich | 37/119 |
| 3,120,714 | 2/1964 | Goodwin | 37/55 UX |
| 3,365,823 | 1/1968 | Vogt | 37/195 X |
| 3,367,048 | 2/1968 | Doughty | 37/55 |

FOREIGN PATENT DOCUMENTS

| | | | |
|---|---|---|---|
| 141,355 | 5/1950 | Australia | 37/119 |
| 2,239,197 | 8/1973 | France | 37/119 |

*Primary Examiner*—Clifford D. Crowder

[57] ABSTRACT

An apparatus for collecting shellfish and the like at the bottom of a body of water comprising a rake having a number of inclined tines or teeth adapted to scrape the bed of the body of water, sliding boxes or runners for holding the tines at a substantially constant angle relative to the bed and a bag net rearwardly of the rake for collecting the shellfish dug up or scooped up by the tines. The apparatus is towed or dragged by a boat or by a rope to be wound by a winch on a boat to collect the shellfish effectively without devastating the water bed and without collecting infant shellfish falling down between the tines, with the result that the resources at the bed of the water are preserved.

6 Claims, 10 Drawing Figures

FIG. 7a
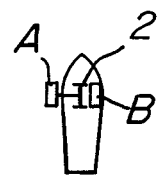
FIG. 7b
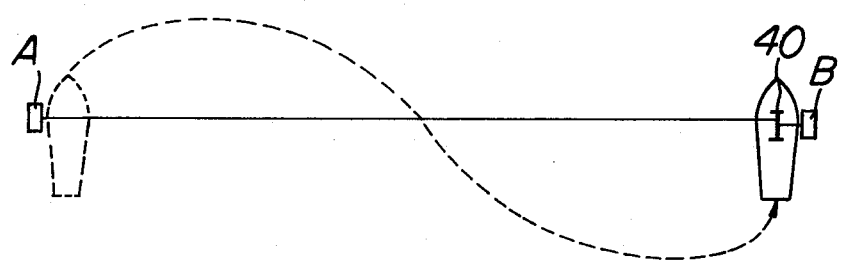
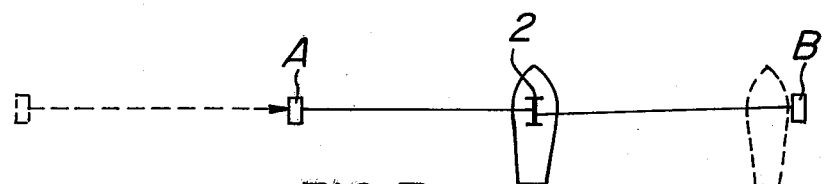
FIG. 7c
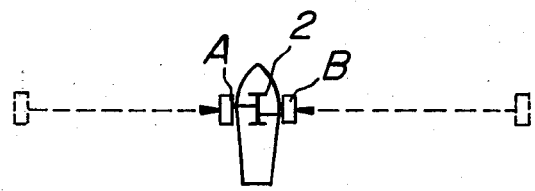
FIG. 7d

4,112,602

APPARATUS FOR COLLECTING SHELLFISH AND THE LIKE

BACKGROUND OF THE INVENTION

1. Field of the Invention

This invention relates to an apparatus and a method for collecting shellfish such as scallops and hen clams and more extensively mollascs and crustaceas that move very slowly at the bottom of a body of water and more particularly to an apparatus and a method for efficiently collecting shellfish without catching infant shellfish in a manner so as to preserve the resources in the sea.

2. Description of the Prior Art

Heretofore, to collect shellfish in sea, sand at the bottom of the sea is dredged by floating cranes, bucket dredgers and similar bulky apparatus, and the dredged shellfish are separated from considerable quantities of the dredged material. Such a method requires bulky equipment and consumes great amounts of energy. It is very difficult and troublesome to move from a position where one floating crane or dredger is anchored to a new position for additional collection of shellfish. As the zones in the sea to be dredged by the floating crane or bucket dredger are limited to relatively shallow bottoms, it is impossible to collect shellfish at the bed of a deep sea. Moreover, the dredging operation by these mechanical apparatuses deeply penetrates the bottom of the sea and devastates it to an impermissible extent. All shellfish in the dredged material are caught including infant shellfish which must be behind alive to insure sufficient shellfish for future catches. The hitherto used method, therefore, gives rise to problems in respect of a preservation of resources.

In another conventional method of collecting shellfish, divers don diver's outfits and collect shellfish at the bottom of the sea into bags which are then pulled up to the deck of a ship when the bags become filled. Such a method, however, is inefficient and requires high personal expenses.

SUMMARY OF THE INVENTION

In order to overcome the above disadvantages in the prior art, the apparatus according to the invention comprises rake means having a number of inclined spaced tines capable of scraping the water bed to cause the shellfish to ride thereon as said apparatus moves, sliding box means or runners for holding the times of said rake means at a substantially constant angle relative to said water bed and a bag net at the rear of said rake means for collecting the shellfish which ride up onto said rake means as said apparatus moves.

The method according to the invention comprises moving the aforesaid tines along the bed of the body of water so as to cause the shellfish to ride thereon and further moving the rake and times in the same direction to collect said shellfish into a bag net at the rear of the rake It is an object of the invention to provide an apparatus for collecting shellfish and the like which is simple in construction and easily moved for catching shellfish and the like over wide areas of a body of water.

It is another object of the invention to provide an apparatus and a method for collecting shellfish and the like which are capable of collecting the shellfish in a relatively deep sea, without devastating the bottom of the sea, and without collecting infant shellfish, with a resultant preservation of resources at the bottom of the sea.

The invention will be more fully understood by referring to the following detailed specification and claims taken in connection with the appended drawings.

BRIEF DESCRIPTION OF THE DRAWINGS

FIGS. 7(a)–(d) are schematic representations showing arrangements of the apparatuses and a ship for implementing a method of collecting shellfish according to the invention.

DETAILED DESCRIPTION OF THE PREFERRED EMBODIMENTS

Figure 1:
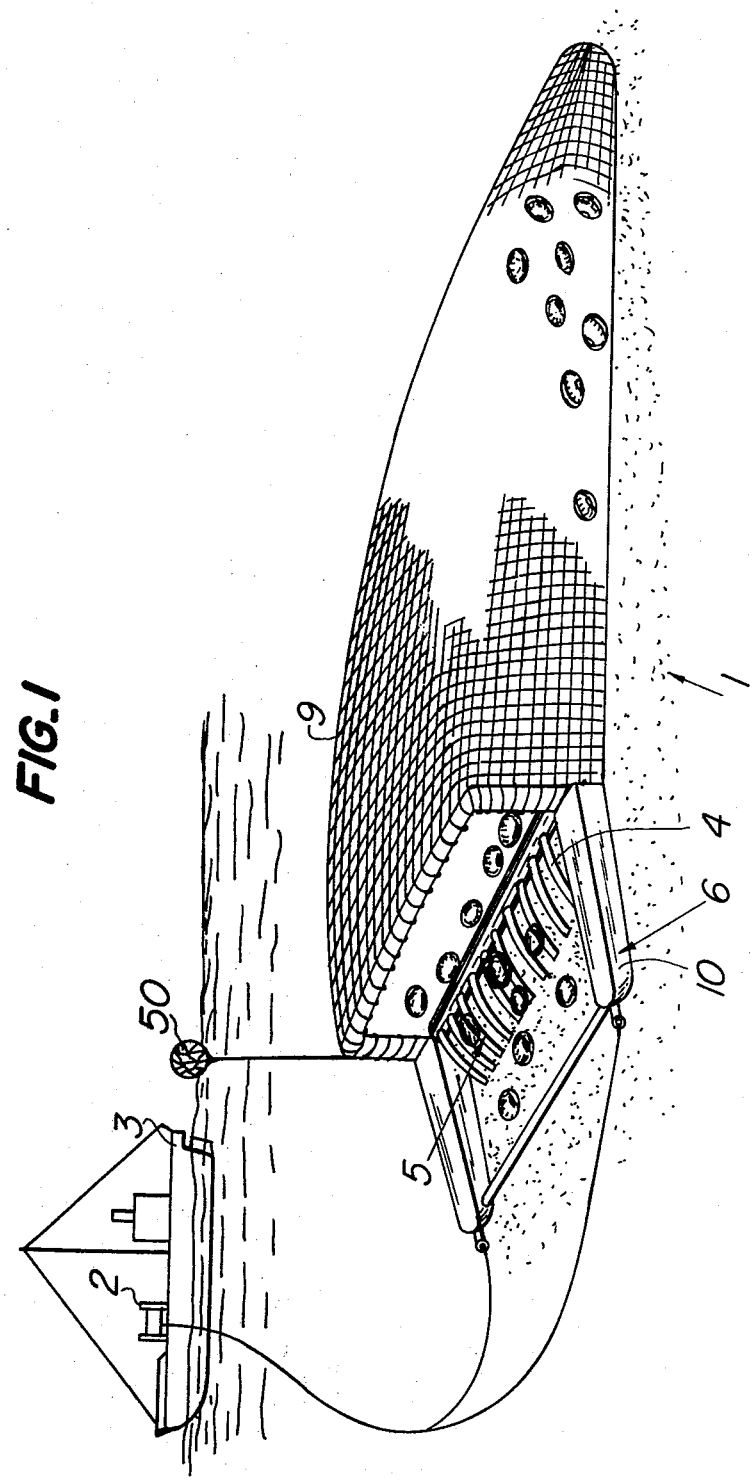
FIG. 1 is a perspective view of a preferred embodiment of the apparatus according to the invention which is being towed or dragged by a boat for collecting shellfish at the bottom of the sea.

Referring first to FIG. 1, there is shown a perspective view of the apparatus 1 according to the invention which is being towed by a winch 2 on a boat or trawler 3 for collecting shellfish on or in sands at the bottom or bed of the sea. The apparatus according to the invention may be towed or dragged by a tugboat or by a warp or rope to be wound by the winch on a boat.

Figure 2:
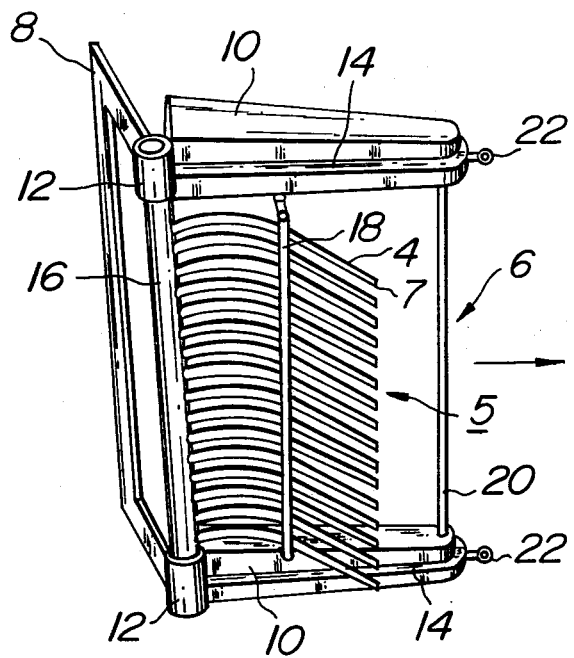
FIG. 2 is a perspective view of one embodiment of the apparatus according to the invention as viewed in the from below the rake being adapted to be contacted with the bottom of the sea.

FIG. 2 is a perspective view of a main body or frame of the apparatus according to the invention as viewed from below adapted to be brought into contact with the bottom of the sea in order to clarify the construction of the apparatus. The main body or frame of the apparatus is to be dragged in a direction of shown big the arrow in FIG. 2. When the apparatus is dragged in the direction of the arrow, the forward ends 7 of a number of tines or teeth 4 of a rake 5 enter the sand and dig up shellfish and the like which ride upwardly onto the tines as the apparatus is dragged in the direction of the arrow. In this manner, the shellfish dug or exposed by scraping of the tines 4 move onto the rake 5 and are collected in a bag net 9 as the apparatus is dragged. In this embodiment, each of the times 4 of the rake 5 is bent in its rear half end and is straight in its forward half end as shown in FIG. 2. The distance between the tines 4 is determined at a suitable value depending upon the shellfish to be collected so that only shellfish which have grown up to adult hood are caught without collecting the infant shellfish which fall down between the tines. Accordingly, the apparatus according to the invention collects shellfish while preserving the seas resources.

In the embodiment shown in FIG. 2, the main body or frame 2 comprises two runner or sliding boxes 10 disposed symmetrically at its sides and a bag net support member 8 having bearings 12 formed integral therewith which are connected to the boxes 10 by means of pipes 14. The bearings 12 rotatably support the ends of a rod 16 of the rake 5. In order to keep the tines 4 of the rake 5 at a predetermined angle relative to the boxes 10, a support rod 18 is welded to the tines in the proximity of their mid portions and is fixed at its ends to the boxes 10. A forward rod 20 connects the forward ends of the boxes 10 to form a rigid frame with the boxes and the rod 16.

In the preferred embodiment, the length of the sliding boxes 10 is about 1.5 meters, the length of the tines 4 is approximately 1.2 meters; the longer sides of the frame 8 are about 2 meters; and the shorter sides of the frame are about 1 meter. The sliding boxes 10 is made of wood. It may of course be metallic. The tines 4 of the rake 5 are welded at their bottoms to the tubular rod 16 and have wear resistant forward ends 7 for a long durability.

Member 8 may be provided with holes or eyes (not shown) for securing a bag net thereto. The sliding boxes 10 are provided at their leading ends with eyes 22 for dragging of the apparatus.

Figure 3:
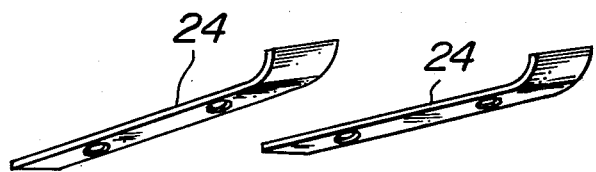
FIG. 3 is a perspective view of a pair of skis for use in the apparatus according to the invention in order to assist the apparatus in its sliding movement across the bed of the body of water.

It is preferable to use a pair of ski 24 secured to the undersides of the sliding boxes to assist the apparatus in its sliding movement as shown in FIG. 3. The skis 24 are preferably secured to the undersides of the sliding boxes by means of bolts having heads sunk in counterbores of each ski.

As can be seen from FIG. 2, the tines 4 of the rake 5 have the substantially straight forward ends. The straight portions of the tines make an angle of 15°-40°, normally about 30° to the sliding boxes or the bottom or bed of the sea. Although the angle of the tines is fixed in the embodiment in FIG. 2, it is more advantageous to adjust the angle depending upon the shellfish and conditions of the sea bottom.

Figure 4:
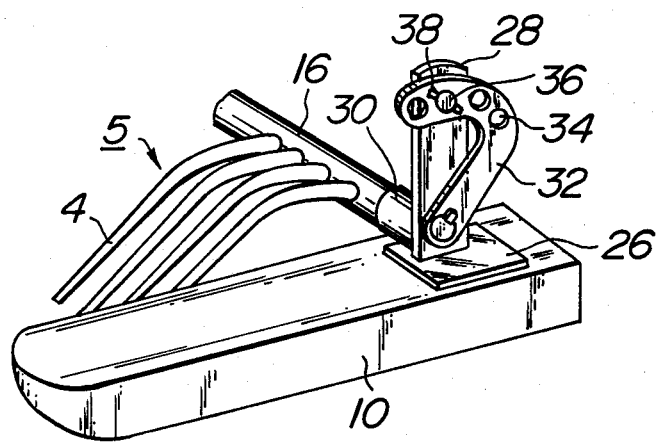
FIG. 4 is a partial perspective view of one embodiment of an angle adjustable rake having angle adjusting means for use in the apparatus according to the invention.

FIG. 4 shows one embodiment of an angle adjustable rake having angle adjusting means therefore. In this embodiment, the sliding box is provided with a metal plate 26, a columnar member or plate 28 and a bearing 30 rigidly fixed to the box as shown in FIG. 4. After one end of a rod or pivot shaft 16 of the rake 5 is inserted in the bearing 30, and adjusting arm 32 is keyed to the end of the rod. Any one of holes 34 formed in an offset section of the adjusting arm 32 is aligned with a hole (not shown) in the upper portion of the columnar member 28 according to the angle of the tines of the rake. Fastening means such as a pin 36 extends through the aligned holes and is retained by means of a split sin (cotter pin) 38, whereby the adjusting arm 32 is rigidly fixed in an adjusted angular position relative to the column plate 28 and the tines are fixed at a predetermined angular relationship with respect to the sea bed. Although the angle adjusting means may be only provided on one of the sliding boxes, respective angle adjusting means may be provided on both sliding boxes which contribute advantageously to the in strength of the rake.

The bag net may be any form of a bag adapted to be secured to member 8 for collecting shellfish. It is preferable that the bag made of a beam trawl net.

A buoy 50 may be connected to the frame by means of a rope in order to indicate the position of the apparatus in the sea (FIG. 1).

Figure 5:
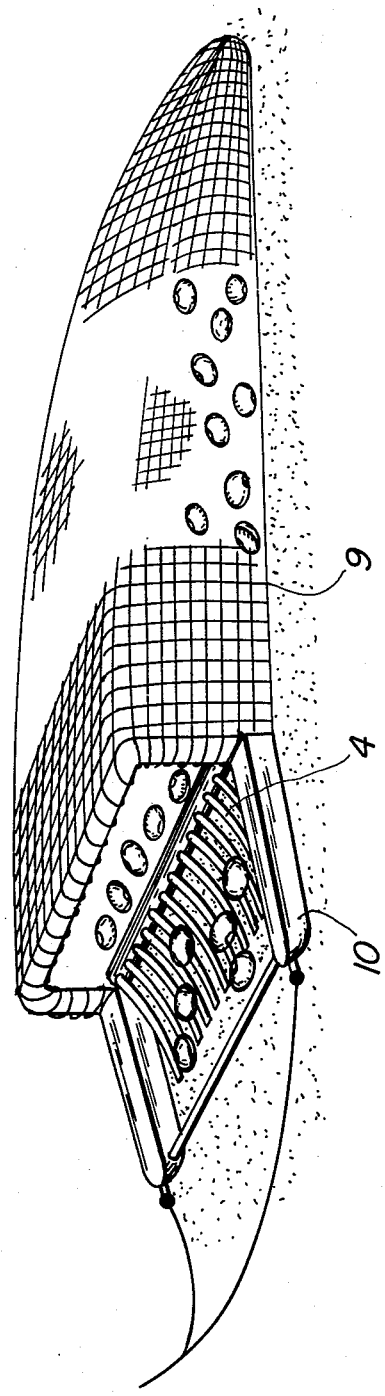
FIG. 5 is a perspective view of another embodiment of the apparatus according to the invention, similar to FIG. 1, wherein the tines of the rake are curved away from the bottom of the sea to scoop shellfishes on the sand.

Although the tines 4 in the above embodiments are curved downwardly so as to dig the sand at the bottom of the sea, the tines may be curved in the reverse direction or away from the bottom of the sea so as to scoop the surface of the sand as shown in FIG. 5. The modified tines are preferable to collect shellfish present on the sand other than those in the sand.

Figure 6:
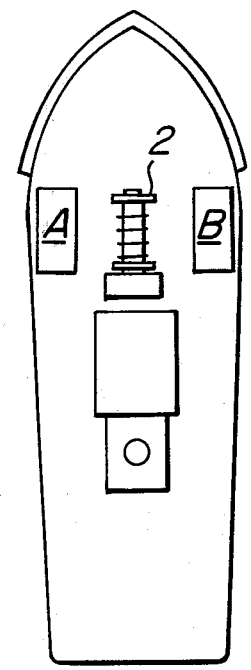
FIG. 6 is a schematic plan view of a boat equipped with two apparatuses according to the invention and a winch to wind up ropes connected to the respective apparatuses.

It is preferable to arrange the apparatuses one on each side of the deck of a boat and a winch 40 therebetween for dragging the apparatuses as shown in FIG. 6. A single winch 40 is commonly used for the two apparatuses. Independent winches may, however be arranged for the respective apparatuses. The engine for driving the boat is advantgeously also used for driving the winch. A separate motor may, of course be used for driving the winch.

A method of collecting shellfish will be explained with reference to FIGS. 6 and 7 wherein two apparatuses A and B are provided on a boat. Referring to FIG. 7(a), the apparatus A is settled in a first position on the bottom of the sea. Then the boat is moved therefrom to a new position as shown by solid line in FIG. 7(b) about for example 100 meters remote from the original position as shown by broken line in FIG. 7b) and there the apparatus B is settled on the bottom of the sea. During movement of the boat, a rope or wire of the apparatus A connected to the boat is of course kept freely extensible. The rope of the apparatus A is then wound up by means of the winch while the rope of the apparatus B is freely extensible. This is the beginning of the collecting operation of the apparatus A. The apparatus A is dragged toward apparatus B by the operation of the winch on the boat, while the boat is also dragged by the resistance of apparatus A in the direction of apparatus A to the location shown in FIG. 7(c). When the apparatus A has been moved through one third of the distance between the original settled positions of the apparatuses A and B, the boat has also been moved through the same distance as shown in FIG. 7(c). In this position, the apparatuses A and B are at the same distance from the boat. From this position, the ropes of the apparatuss A and B are simultaneoulsy wound up. As the forces acting upon the ropes of the apparatuses are substantially equal, the boat is not moved but the respective apparatuses A and B are pulled toward the boat while shellfish are collected into the respective bags until the apparatuses A and B reach the boat as shown in FIG. 7(d). The apparatuses with bag nets full of the shellfish are then raised and brought onto the deck of the boat.

It is understood by those skilled in the art that the foregoing description is a preferred embodiment of the disclosed apparatus and that various changes and modifications may be made in the invention without departing from the spirit and scope thereof.

What is claimed is:

1. Apparatus for collecting shellfish and the like from the bed of a body of water comprising a frame including a pair of longitudinally extending parallel spaced runners and a bag net support member projecting upwardly from the rear ends of said runners, a bag net mounted on said support member adapted to receive and hold shellfish collected from the bed by a rake, a rake carried pivotably by and extending between said runners and comprising a pivot shaft having a plurality of substantially parallel spaced tines thereon, at least one of said runners having an upwardly extending columnar member with at least one aperture therein, said pivot shaft being journaled in said columnar member and having an adjusting arm secured to at least one end of said pivot shaft for rotation therewith, one end of said adjusting arm comprising an offset section in which a plurality of apertures are formed alignable with said at least one aperture in said columnar member, and fastening means for insertion through the aligned apertures of the corresponding columnar member and adjusting arm for fixing the shaft and the tines thereon in predetermined angular relation to the bed of the body of water.

2. Apparatus according to claim 1, wherein said runners are symmetrically arranged to define the opposed sides thereof.

3. Apparatus according to claim 1, wherein eyelets are provided on the ends of said runners remote from said bag net support member to permit towing of the apparatus.

4. Apparatus for collecting shellfish and the like as set forth in claim 1, including ski means secured to the undersides of said runners to facilitate sliding movement of the apparatus on the bed.

5. Apparatus for collecting shellfish and the like as set forth in claim 1, wherein said tines of said rake are curved downwardly such that the free ends thereof penetrate into the sand of the bed thereby digging up shellfish in the sand.

6. Apparatus for collecting shellfish and the like as set forth in claim 1, wherein said tines of said rake are curved away from the bed so as to thereby permit scooping of the shellfish on the sand of the bed.

* * * * *